United States Patent
Gao (10) Patent No.: US 11,488,523 B2
(45) Date of Patent: Nov. 1, 2022

(54) DISPLAY DEVICE, METHOD FOR DRIVING SAME, AND DISPLAY SYSTEM

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventor: Feng Gao, Beijing (CN)

(73) Assignees: BEIJING BOE OPTOELECTRONICS TECHNOLOGY CO., LTD., Beijing (CN); BEIJING BOE TECHNOLOGY DEVELOPMENT CO., LTD., Beijing (CN)

( * ) Notice: Subject to any disclaimer, the term of this patent is extended or adjusted under 35 U.S.C. 154(b) by 0 days.

(21) Appl. No.: 17/363,189

(22) Filed: Jun. 30, 2021

(65) Prior Publication Data

US 2022/0189390 A1    Jun. 16, 2022

(30) Foreign Application Priority Data

Dec. 15, 2020    (CN) .......................... 202011478550.6

(51) Int. Cl.
*G06F 3/038* (2013.01)
*G09G 3/3208* (2016.01)
*G06F 13/42* (2006.01)

(52) U.S. Cl.
CPC ....... *G09G 3/3208* (2013.01); *G06F 13/4282* (2013.01); *G06F 2213/0042* (2013.01); *G09G 2330/022* (2013.01); *G09G 2370/22* (2013.01)

(58) Field of Classification Search
CPC ........... G09G 3/3208; G09G 2330/022; G09G 2370/22; G06F 13/4282; G06F 2213/0042
USPC ......................................................... 345/212
See application file for complete search history.

(56) References Cited

U.S. PATENT DOCUMENTS

| | | | | |
|---|---|---|---|---|
| 5,790,096 A | * | 8/1998 | Hill, Jr. .................. | G09G 5/028 345/600 |
| 2005/0105913 A1 | * | 5/2005 | Ozeki .............. | H04B 10/07955 398/140 |
| 2013/0265340 A1 | * | 10/2013 | Ahn ......................... | G09G 5/02 345/212 |
| 2015/0187304 A1 | * | 7/2015 | Ko ......................... | G06F 1/3265 345/94 |
| 2020/0118565 A1 | * | 4/2020 | Shao ....................... | G09F 9/301 |

* cited by examiner

*Primary Examiner* — Jonathan M Blancha
(74) *Attorney, Agent, or Firm* — Fay Sharpe LLP (57) ABSTRACT

A display device, a method for driving the same, and a display system are provided. In the display device, a drive circuit can first drive the display panel to display a target image containing a number of colors less than a number threshold in response to detecting that a host computer stops delivering image data (i.e., the screen is turned off), and then drive the display panel to enter a standby state. In this way, the display panel can be made to stably transition to the standby state upon screen-off of the host computer, thereby solving the problems of stalled display or abnormal display caused by the display panel being unable to enter the standby state reliably.

20 Claims, 4 Drawing Sheets

DISPLAY DEVICE, METHOD FOR DRIVING SAME, AND DISPLAY SYSTEM

This application is based on and claims priority to Chinese Patent Application No. 202011478550.6, filed on Dec. 15, 2020 and entitled "DISPLAY DEVICE, METHOD FOR DRIVING SAME, AND DISPLAY SYSTEM," the disclosure of which is incorporated herein by reference in its entirety.

TECHNICAL FIELD

The present disclosure relates to the field of display technologies, and in particular relates to a display device, a method for driving the same, and a display system.

BACKGROUND

Augmented reality (AR) display devices are devices that can superimpose the real environment and virtual objects on a screen to be displayed to users, and content displayed by the AR display devices generally comes from host computers such as mobile phones or computers.

In the related art, the AR display device generally includes a drive circuit and a display panel coupled to each other. The drive circuit is further configured to couple to a host computer. In response to the host computer delivering image data, the drive circuit transmits a drive signal to the display panel to drive the display panel to display an image. In response to the host computer stops delivering image data, the drive circuit stops transmitting the drive signal to the display panel, such that the display panel stops displaying the image.

SUMMARY

Embodiments of the present disclosure provide a display device, a method for driving the same, and a display system.

In one aspect, a display device is provided. The display device includes a drive circuit and a display panel; wherein
the drive circuit is coupled to the display panel and coupled to a host computer, and is configured to transmit a drive signal to the display panel in response to detecting that the host computer stops delivering first image data, and transmit a standby instruction to the display panel upon transmitting the drive signal; and
the display panel is configured to display a target image in response to the drive signal, and switch from an operating state to a standby state in response to the standby instruction;
wherein a number of colors contained in the target image is less than a number threshold.

In some embodiments, the target image is a single-color image.

In some embodiments, the target image is a black image.

In some embodiments, the drive signal carries image data of the target image.

In some embodiments, the drive circuit is further configured to transmit a resume instruction carrying the first image data to the display panel in response to detecting that the host computer delivers the first image data when the display panel is in the standby state; and
the display panel is configured to switch from the standby state to the operating state in response to the resume instruction, and display an image based on the first image data upon switching to the operating state.

In embodiments, the drive circuit is configured to determine that the host computer stops delivering the first image data in response to not receiving image data delivered by the host computer within a target time period upon receipt of the first image data.

In some embodiments, both the drive circuit and the display panel include a mobile industry processor interface (MIPI), and the drive circuit is coupled to the display panel by the MIPI and transmits signals and instructions to the display panel by the MIPI.

In some embodiments, the display device further includes a first power supply circuit, a second power supply circuit, a control circuit, and an image acquisition assembly; wherein
the first power supply circuit is coupled to the drive circuit and the display panel, and is configured to supply power to the drive circuit and the display panel;
the second power supply circuit is coupled to the control circuit and the image acquisition assembly, and is configured to supply power to the control circuit and the image acquisition assembly;
the control circuit is further coupled to the drive circuit, the first power supply circuit, and the image acquisition assembly, and is configured to control operating states of the drive circuit and the first power supply circuit, and transmit second image data acquired by the image acquisition assembly to the drive circuit;
the drive circuit is further configured to transmit the first image data and the second image data received from the host computer to the display panel; and
the display panel is configured to display an image based on the first image data and the second image data.

In some embodiments, the control circuit is a microcontroller unit (MCU).

In some embodiments, the display device is an augmented reality (AR) device.

In some embodiments, the display panel is an organic light-emitting diode (OLED) display panel, and a resolution of the display panel is greater than a resolution threshold.

In another aspect, a method for driving a display device is provided, which is applicable to the drive circuit of the display device as described in the above aspect. The method includes:
transmitting a drive signal to a coupled display panel in response detecting that a coupled host computer stops delivering first image data, wherein the drive signal is intended to instruct the display panel to display a target image, a number of colors contained in the target image being less than a number threshold; and
transmitting a standby instruction to the display panel upon transmitting the drive signal, wherein the standby instruction is intended to instruct the display panel to switch from an operating state to a standby state.

In still another aspect, a display system is provided. The display system includes a host computer and a display device as described in the above aspect; wherein
the host computer is coupled to the drive circuit in the display device, and is configured to deliver image data to the drive circuit.

In some embodiments, the host computer is further coupled to the control circuit, the first power supply circuit, and the second power supply circuit in the display device; and
the host computer is configured to communicate with the control circuit and supply power to the first power supply circuit and the second power supply circuit.

In some embodiments, the host computer is a mobile phone.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and other drawings may be derived by persons of ordinary skill in the art from these accompanying drawings without creative efforts.

DETAILED DESCRIPTION

For clearer descriptions of the objectives, technical solutions, and advantages of the present disclosure, embodiments of the present disclosure are described in detail hereinafter referring to the accompanying drawings.

The AR technology is a new technology that can promote "seamless" integration of real world information (i.e., real environment) and virtual world information (i.e., virtual environment). As an important carrier of the AR technology, AR display devices (such as AR glasses) have made significant progress in recent years and have been widely used in various fields, such as security, education, medical care, advertising, exhibition and the like. Moreover, most AR display devices are passive display devices, and content displayed by AR display devices generally comes from host computers such as mobile phones or personal computers (PCs).

In addition, with the development of display technologies, in AR display devices, display panels are no longer limited to traditional liquid crystal display (LCD) panels and light-emitting diodes (LED) display panels, and a series of organic light-emitting diode (OLED) display panels with ultra-high resolution come into being. However, because the ultra-high-resolution OLED display panel is an emerging product, and such display panels lack a unified standard for display control, the ultra-high-resolution OLED display panel will still be in a normal operating state upon screen-off of the host computer. In this way, not only the overall power consumption of the AR display device is increased, but also due to abnormal operating conditions, the ultra-high resolution OLED display panel is very likely to have problems such as stalled display or abnormal display, which affects the user experience.

Embodiments of the present disclosure provide a display device. A drive circuit in the display device can flexibly control a display state of the display panel upon screen-off a host computer so as to effectively solve the above problems of the high power consumption of the entire display device and stalled display or abnormal display of the display panel. The display panel in the display device has better operation reliability.

Figure 1:
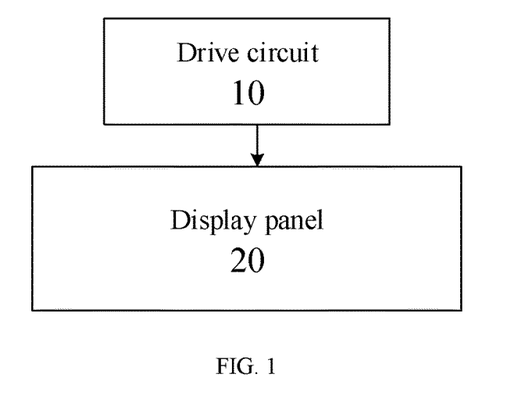
FIG. 1 is a schematic structural diagram of a display device according to an embodiment of the present disclosure.

FIG. 1 is a schematic structural diagram of a display device according to an embodiment of the present disclosure. As shown in FIG. 1, the display device includes a drive circuit 10 and a display panel 20.

The drive circuit 10 is coupled (i.e., electrically connected) to the display panel 20 and may be configured to couple to a host computer (not shown). The drive circuit 10 is configured to transmit a drive signal to the display panel 20 in response to detecting that the host computer stops delivering first image data, and transmit a standby instruction to the display panel 20 upon transmitting the drive signal. Stopping delivering the first image data may also be referred to as no display signal output.

The display panel 20 is configured to display a target image (also referred to as a target screen) in response to the received drive signal, and switch from an operating state to a standby state in response to the received standby instruction.

A number of colors contained in the target image is less than a number threshold. The number threshold may be a fixed value pre-stored in the drive circuit 10. For example, assuming that the number threshold is 3, the number of colors contained in the target image may be 1 or 2. That is, the target image may be a pure color image (such as a black image/white image), or the target image may be a two-color image (such as a black and white grid image).

In some embodiments, the display panel 20 may generally include a plurality of pixels. Accordingly, the color included in the target image may refer to the number of different grayscale values of the plurality of pixels in response to the display panel 20 displaying the target image. For example, assuming that the display panel 20 includes N pixels, in response to the target image being displayed, the grayscale values of m pixels in the N pixels are 0, and the grayscale values of the remaining N minus m pixels are 255, then it can be determined that the N pixels have a total of 2 different grayscale values 0 and 255. Furthermore, it can be determined that the number of colors of the target image displayed on the display panel 20 is 2. N is an integer greater than 0, and m is greater than 0 and less than N.

In conjunction with the coupling structure shown in FIG. 1 and the above description, the operating principle of the drive circuit 10 is introduced as follows.

In an exemplary embodiment, upon screen-off of the host computer, the host computer no longer delivers image data to the drive circuit 10. That is, the host computer has no display signal output. In this case, the drive circuit 10 may first transmit a drive signal to the display panel 20 to drive the display panel 20 to display a target image containing a smaller number of colors. In this way, problems such as stalled display and abnormal display caused by the display panel 20 continuing to operate normally due to loss of control upon screen-off of the host computer may be avoided. Then, in response to the display panel 20 displaying the target image, the drive circuit 10 may actively take over the power management of the display panel 20, and then continue to transmit a standby instruction to the display panel 20 to drive the display panel 20 to transition from an operating state to a standby state stably. In this way, the problem of high power consumption of the entire display device caused by the display panel 20 continuing to operate normally due to loss of control may be avoided. In this way, it can be determined that the display panel 20 described in the embodiment of the present disclosure has better operation reliability.

In some embodiments, because the drive circuit 10 is a circuit bridged between the host computer and the display panel 20, and is configured to control the display panel 20 to display images based on the image data issued by the host computer, the drive circuit 10 may also be referred to as a bridge integrated circuit (bridge IC).

In summary, an embodiment of the present disclosure provides a display device. A drive circuit in the display device can first drive the display panel to display a target image containing a number of colors less than a number threshold in response to detecting that a host computer stops delivering image data (i.e., the screen is turned off), and then drive the display panel to enter a standby state. In this way, the display panel may be made to stably transition to the standby state upon screen-off of the host computer, thereby solving the problems of stalled display or abnormal display caused by the display panel being unable to enter the standby state reliably. The display panel in the display device according to the embodiment of the present disclosure has better operation reliability.

In some embodiments, in the embodiment of the present disclosure, the drive circuit 10 may be configured to determine that the host computer stops delivering the first image data in response to image data delivered by the host computer being not received within a target time period upon receipt of the first image data. That is, whether the host computer stops delivering the first image data based on the operation of delivering the image data of the host computer may be directly determined by the drive circuit 10.

Whether the host computer stops delivering the first image data in other ways may be determined by the drive circuit 10 as well. For example, the host computer may transmit an instruction to the drive circuit 10 upon screen-off of the host computer to notify the drive circuit 10 that the host computer is to stop delivering the first image data. That is, whether the host computer stops delivering the first image data based on the instruction transmitted by the host computer may be determined by the drive circuit 10. The above methods are only illustrative.

In some embodiments, in the embodiment of the present disclosure, the drive signal transmitted by the drive circuit 10 to the display panel 20 may carry image data (e.g., image stream) of the target image. Accordingly, the target image may be displayed reliably by the display panel 20 based on the received image data.

For example, the display panel 20 may first parse the received image data to determine the grayscale value of each pixel in the plurality of pixels included in the image data, and then each pixel is lit based on the determined grayscale value to complete the display of the target image.

In some embodiments, the target image described in the embodiment of the present disclosure may be a single-color image (which may also be referred to as a pure color image). That is, the number of colors contained in the target image may be 1.

Since displaying a single-color image has a lower probability of stalled display and abnormal display of the display panel 20 as compared to displaying a more-color image, the display panel 20 being driven by the drive circuit 10 to display a single-color image can further ensure better operation reliability of the display panel 20.

In some embodiments, the single color may be black. That is, the target image described in the embodiment of the present disclosure may be a black image. Based on the above description of the function of the drive circuit 10, it can be understood that the operation of the drive circuit 10 driving the display panel 20 to display the black image in response to detecting that the host computer stops delivering the first image data may also be referred to as the drive circuit 10 immediately outputting a black screen to erase the display panel 20, i.e., erasing the display panel 20 in response to detecting that the host computer stops delivering the first image data, i.e., the host computer has no display signal output.

In response to detecting that the host computer stops delivering image data, it is generally necessary to control the display panel 20 to also turn off the screen (i.e., black screen) at the same time, so the drive circuit 10 driving the display panel 20 to display a black image in time upon screen-off of the host computer can avoid the problem that the display panel 20 displaying target images of other colors, which results in poorer user experience.

The above is only a schematic description of the optional types of the target image. The target image may also be a pure white image described in the above embodiment, or a black and white grid image.

In some embodiments, in conjunction with the description of the above embodiments, the drive circuit 10 drives the display panel 20 into a standby state in response to detecting that the host computer stops delivering image dat. Therefore, in the embodiment of the present disclosure, the drive circuit 10 may be further configured to transmit a resume instruction carrying the first image data to the display panel 20 in response to detecting that the host computer delivers the first image data again when the display panel 20 is in the standby state.

The display panel 20 may be configured to switch from the standby state to the operating state in response to the resume instruction, and may display an image based on the first image data carried in the resume instruction upon switching to the operating state.

In an exemplary embodiment, in response to the host computer switching from the screen-off state to the operating state again, the host computer is to continue delivering the first image data to the drive circuit 10. In this case, the drive circuit 10 may transmit the resume instruction carrying the first image data to the display panel 20, so that the display panel 20 can be reliably awoken under the control of the resume instruction, and then reliably display the image again by parsing the first image data in the resume instruction. In this way, better operation reliability of the display panel 20 is further ensured.

Figure 2:
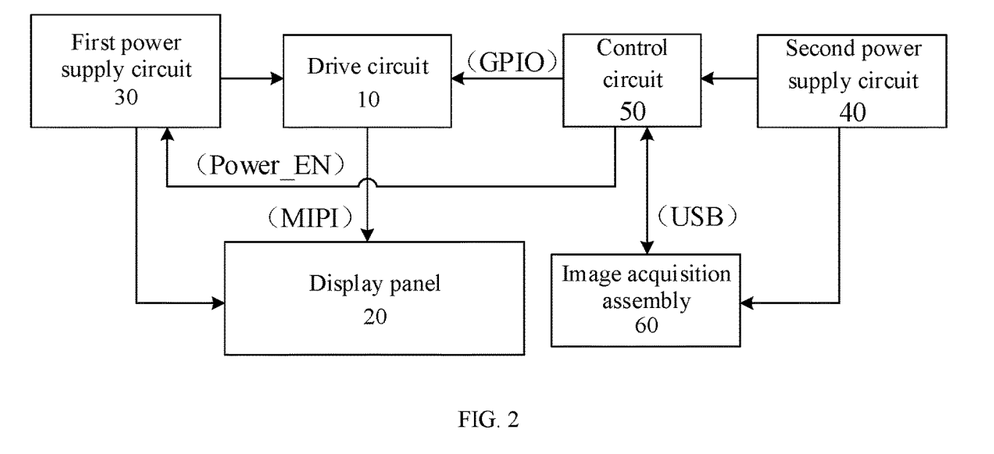
FIG. 2 is a schematic structural diagram of another display device according to an embodiment of the present disclosure.

In some embodiments, FIG. 2 is a schematic structural diagram of another display device according to an embodiment of the present disclosure. With reference to FIG. 2, it can be seen that both the drive circuit 10 and the display panel 20 according to the embodiment of the present disclosure may include a mobile industry processor interface (MIPI). The drive circuit 10 may be coupled to the display panel 20 by the MIPI, and transmit signals and instructions to the display panel 20 by the MIPI.

For example, the drive circuit 10 and the display panel 20 may be coupled by a cable adapted to the MIPI interface. The drive circuit 10 may transmit the drive signal carrying the image data of the target image, the standby instruction, and the resume instruction carrying the first image data to the display panel 20 by the MIPI interface and the cable.

In some embodiments, still referring to FIG. 2, the display device may further include a first power supply circuit 30, a second power supply circuit 40, a control circuit 50, and an image acquisition assembly 60. For example, the image acquisition assembly 60 may be a camera.

The first power supply circuit 30 may be coupled to the drive circuit 10 and the display panel 20. The first power supply circuit 30 may be configured to supply power to the drive circuit 10 and the display panel 20, such that the drive circuit 10 and the display panel 20 operate reliably.

The second power supply circuit 40 may be coupled to the control circuit 50 and the image acquisition assembly 60. The second power supply circuit 40 may be configured to supply power to the control circuit 50 and the image acquisition assembly 60 such that the control circuit 50 and the image acquisition assembly 60 operate reliably.

The control circuit 50 may be further coupled to the drive circuit 10, the first power supply circuit 30, and the image acquisition assembly 60, and may be further configured to couple to the host computer (not shown in the figure). The control circuit 50 may be configured to control operating states of the drive circuit 10 and the first power supply circuit 30, and may transmit second image data acquired by the image acquisition assembly 60 to the drive circuit 10.

In an exemplary embodiment, still referring to FIG. 2, the control circuit 50 may include a general-purpose input/output (GIPO) pin and a universal serial bus (USB) interface. The control circuit 50 may be coupled to the drive circuit 10 by the GIPO pin, and control the operating states of the drive circuit 10 and the first power supply circuit 30 by the GIPO pin. The control circuit 50 may be coupled to the image acquisition assembly 60 by the USB interface, and receive the second image data transmitted by the image acquisition assembly 60 by the USB interface.

For example, the control circuit 50 may be configured to transmit a disable signal to the first power supply circuit 30 in response to determining that the drive circuit 10 is to switch from the operating state to the standby state, such that the first power supply circuit 30 stops supplying power to the drive circuit 10 to ensure that the drive circuit 10 is reliably switched to the standby state. The control circuit 50 may be configured to transmit an enable signal to the first power supply circuit 30 in response to determining that the drive circuit 10 is to switch from the standby state to the operating state, such that the first power supply circuit 30 continues to supply power to the drive circuit 10 to ensure that the drive circuit 10 is reliably switched to the standby state again. The control circuit 50 may transmit the second image data acquired by the image acquisition assembly 60 to the host computer, and the host computer transmits the second image data to the drive circuit 10.

As another example, referring to FIG. 2, the first power supply circuit 30 may have a power enable pin Power_EN. Accordingly, the control circuit 50 transmitting the disable signal to the first power supply circuit 30 may mean that the control circuit 50 pulls down the potential of Power_EN. The control circuit 50 transmitting the enable signal to the first power supply circuit 30 may mean that the control circuit 50 pulls up the potential of Power_EN. Pulling down the potential and pulling up the potential are relative terms.

In some embodiments, the control circuit 50 described in the embodiment of the present disclosure may be a microcontroller unit (MCU). Because the MCU has many pins, the control circuit 50 can be sufficiently configured to implement status monitoring and control of internal function modules of the display device, i.e., to implement the above functions.

The drive circuit 10 may be further configured to transmit the first image data and the second image data received from the host computer to the display panel 20. The display panel 20 may be configured to display an image based on the first image data and the second image data.

In conjunction with the description of the above embodiments, by providing different power supply circuits for supplying power to the drive circuit 10 and the control circuit 50, the operation reliability of the drive circuit 10 and the control circuit 50 can be ensured. By providing the control circuit 50, the functions of the display device can be enriched, and the operation reliability of the drive circuit 10 can be ensured. By providing the image acquisition assembly 60, a solid foundation is laid for the implementation of the AR technology.

That is, the display device described in the embodiment of the present disclosure may be an AR device. The second image data acquired by the image acquisition assembly 60 may be used as original materials for the AR device to implement some functions (such as face recognition or ranging), such that interaction between the AR device and the real world can be enhanced.

In some embodiments, the display panel 20 may be an organic light-emitting diode (OLED) display panel 20, and a resolution of the display panel 20 may be greater than a resolution threshold. That is, the display panel 20 may be an OLED display panel with ultra-high resolution.

In summary, an embodiment of the present disclosure provides a display device. The drive circuit in the display device can first drive the display panel to display a target image containing a number of colors less than a number threshold in response to detecting that the host computer stops delivering image data (i.e., the screen is turned off), and then drive the display panel to enter a standby state. In this way, the display panel can be made to stably transition to the standby state upon screen-off of the host computer, thereby solving the problems of stalled display or abnormal display caused by the display panel being unable to enter the standby state reliably. The display panel in the display device according to the embodiment of the present disclosure has better operation reliability.

Figure 3:
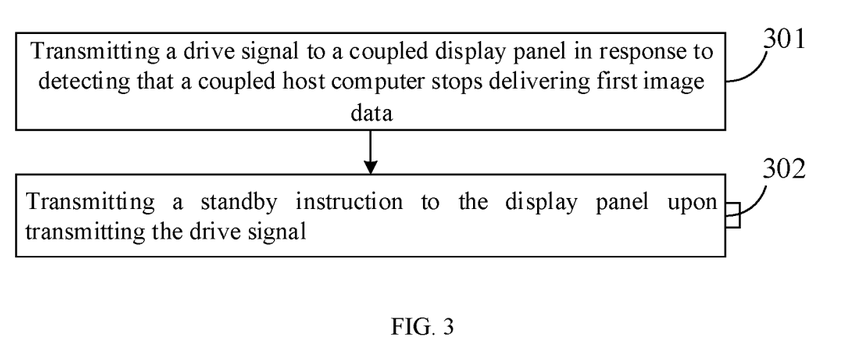
FIG. 3 is a flowchart of a method for driving a display device according to an embodiment of the present disclosure.

FIG. 3 is a flowchart of a method for driving a display device according to an embodiment of the present disclosure. The method may be applicable to the drive circuit 10 of the display device as shown in FIG. 1 or FIG. 2. As shown in FIG. 3, the method may include the following steps.

In step 301, a drive signal is transmitted to a coupled display panel in response to detecting that a host computer stops delivering first image data.

The drive signal may be configured to instruct the display panel to display a target image, and a number of colors contained in the target image may be less than a number threshold.

In step 302, a standby instruction is transmitted to the display panel upon transmission of the drive signal.

The standby instruction may be configured to instruct the display panel to switch from an operating state to a standby state.

Figure 4:
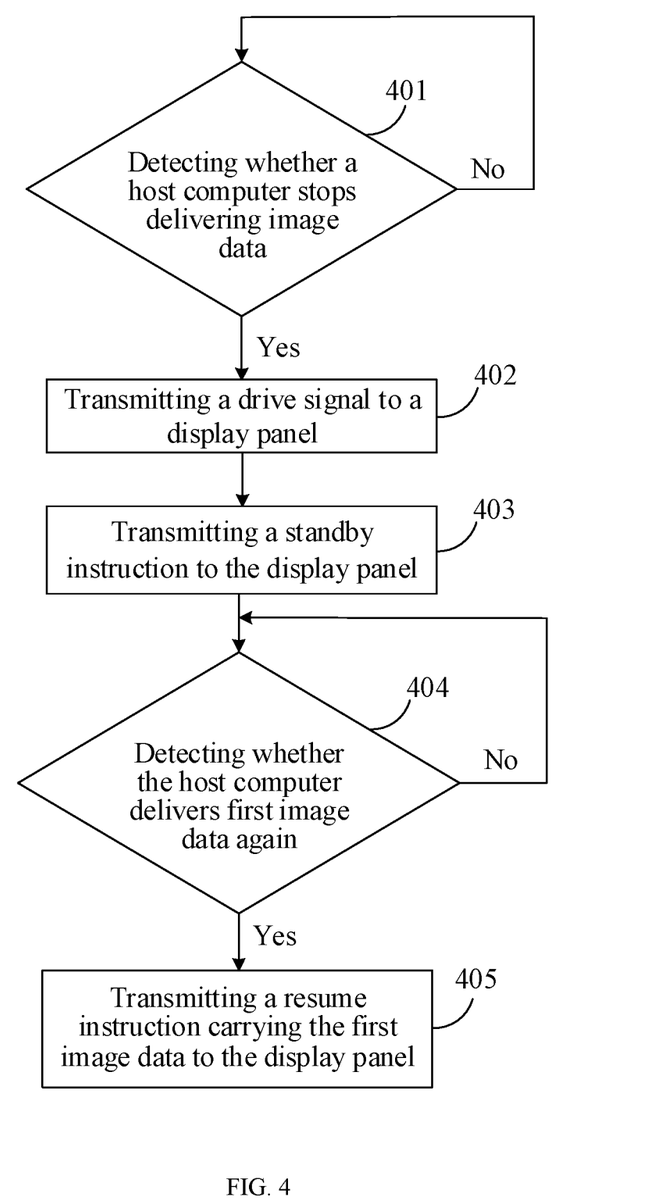
FIG. 4 is a flowchart of another method for driving a display device according to an embodiment of the present disclosure.

In some embodiments, FIG. 4 is a flowchart of another method for driving a display device according to an embodiment of the present disclosure. As shown in FIG. 4, the method may include the following steps.

In step 401, whether a host computer stops delivering first image data is detected.

In some embodiments, in conjunction with the description of the above embodiments, during the normal operation of the host computer, a drive circuit may actively detect whether the host computer stops delivering image data, i.e., whether the screen is turned off. Where the drive circuit detects that the host computer stops delivering the first image data, step 402 may be performed. Where the drive circuit detects that the host computer does not stop delivering the first image data, step 401 may be performed.

In step 402, a drive signal is transmitted to the display panel.

In some embodiments, in conjunction with the description of the above embodiments, the drive signal may carry image data of a target image. Accordingly, the drive signal may be configured to instruct the display panel to display a target image containing a number of colors less than a number threshold.

For example, where the target image is a black image, step 402 may be described as the drive circuit transmitting a black image to the display panel to drive the display panel to display the black image, i.e., erasing the display panel.

In step 403, a standby instruction is transmitted to the display panel.

In some embodiments, in conjunction with the description of the above embodiments, the standby instruction may be configured to instruct the display panel to switch from an operating state to a standby state. That is, where the display panel is driven to display the target image, the drive circuit may actively take over the power management of the display panel and transmit the standby instruction to the display panel to ensure that the display panel transitions to the standby state stably.

In step 404, whether the host computer delivers the first image data again is detected.

In some embodiments, upon screen-off the host computer, the drive circuit may actively detect whether the host computer delivers the first image data again. Where the drive circuit detects that the host computer delivers the first image data again, step 405 may be performed. Where the drive circuit detects that the host computer does not deliver the first image data again, step 404 may be performed.

In step 405, a resume instruction carrying the first image data is transmitted to the display panel.

In some embodiments, in conjunction with the description of the above embodiments, the resume instruction may be configured to instruct the display panel to switch from the standby state to the operating state, and display an image based on the first image data. That is, the drive circuit can ensure that the display panel can be reliably awoken and continue to display reliably by transmitting the resume instruction to the display panel.

In summary, the embodiment of the present disclosure provides a method for driving a display device. In this method, a drive circuit in the display device can first drive the display panel to display a target image containing a number of colors less than a number threshold in response to detecting that the host computer stops delivering image data (i.e., the screen is turned off), and then drive the display panel to enter a standby state. In this way, the display panel can be made to stably transition to the standby state upon screen-off of the host computer, thereby solving the problems of stalled display or abnormal display caused by the display panel incapable of entering the standby state reliably. The display panel in the display device according to the embodiment of the present disclosure has better operation reliability.

Figure 5:
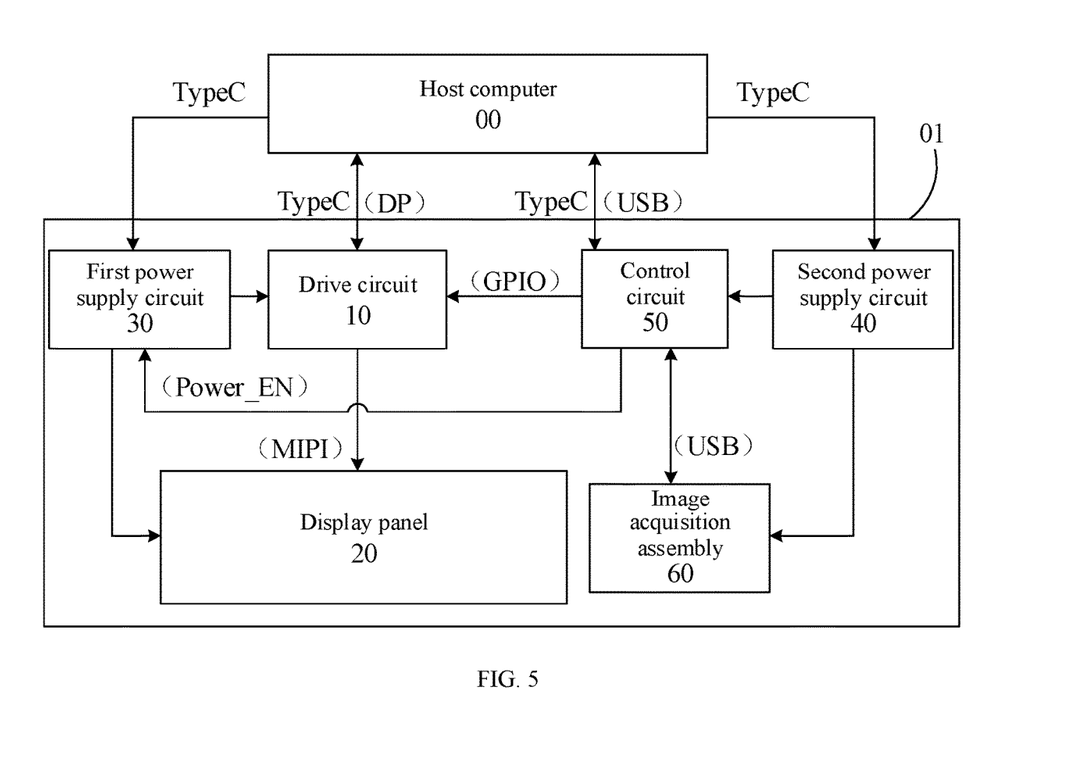
FIG. 5 is a schematic structural diagram of a display system according to an embodiment of the present disclosure.

FIG. 5 is a schematic structural diagram of a display system according to an embodiment of the present disclosure. As shown in FIG. 5, the display system may include a host computer 00 and the display device 01 as shown in FIG. 1 or FIG. 2.

Referring to FIG. 5, the host computer 00 may be coupled to the drive circuit 10 in the display device 01. The host computer may be configured to deliver image data to the drive circuit 10. In some embodiments, in conjunction with the description of the above embodiments, the image data may include first image data and/or second image data.

In some embodiments, still referring to FIG. 5, the host computer 00 may further be coupled to the control circuit 50, the first power supply circuit 30, and the second power supply circuit 40 in the display device 01. Accordingly, the host computer 00 may be further configured to communicate with the control circuit 50 and supply power to the first power supply circuit 30 and the second power supply circuit 40. That is, the first power supply circuit 30 may supply power to a coupled structure under driving by the host computer 00 (including the drive circuit 10 and the display panel 20). The second power supply circuit 40 may supply power to a coupled structure under driving by the host computer 00 (including the control circuit 50 and the image acquisition assembly 60).

In some embodiments, the host computer described in the embodiment of the present disclosure may be a mobile phone, and may also be another terminal capable of providing image data, such as a PC.

In some embodiments, in the display system shown in FIG. 5, the host computer 00 may be coupled to the first power supply circuit 30, the second power supply circuit 40, the control circuit 50 and the drive circuit 10 by a Type C cable. An interface used for coupling between the host computer 00 and the control circuit 50 may be a universal serial bus (USB) interface. An interface used for coupling between the host computer 00 and the drive circuit 10 may be a display interface (DI).

Based on the above introduction to the display system, it can be determined that the display system may be divided into a main control part, a display part and an image acquisition part. The host computer 00, which can be used as a source of the content displayed by the display device and can supply computing support to the display device 01, belongs to the main control part. In addition, the host computer 00 can also supply power supply to the display device 01 at the same time. The drive circuit 10 and the display panel 20, the main function of which is to implement the visualization of the display device 01, belong to the display part. The image acquisition assembly 60 belongs to the image acquisition part, and is mainly configured to implement the image acquisition function, and supply original materials to the display device 01 to implement some functions (e.g., face recognition or ranging). The control circuit 50 may belong to the display part or the image acquisition part.

It should be noted that the double arrow in the accompanying drawings indicates that the two mutually coupled can transmit information to each other, and the single arrow indicates that the two mutually coupled can only transmit information from one end to the other end pointed by the arrow. In addition, the embodiments of the present disclosure are not limited to the above coupling lines and interfaces to establish a coupling, which are merely illustrative.

It should be understood that the terms "first," "second," and the like in the specification and claims of the embodiments of the present disclosure and in the accompanying drawings are merely intended to distinguish similar objects, but are not necessarily intended to describe a specific sequence or order. It should be understood that the data thus used is interchangeable in appropriate circumstances. For example, the data can be implemented in an order other than those illustrated or described in the embodiment of the present disclosure.

The term "and/or" mentioned herein indicates three relationships. For example, A and/or B may indicate that: only A exists, both A and B exist, and only B exists. The symbol "/" generally indicates an "OR" relationship between the associated objects.

Described above are merely exemplary embodiments of the present disclosure, but are not intended to limit the present disclosure. Any modifications, equivalent replacements, improvements and the like made within the spirit and principles of the present disclosure should be included within the scope of protection of the present disclosure.

What is claimed is:

1. A display device, comprising a drive circuit and a display panel; wherein
   the drive circuit is coupled to the display panel and coupled to a host computer, and is configured to transmit a drive signal to the display panel in response to detecting that the host computer stops delivering first image data, and transmit a standby instruction to the display panel upon transmitting the drive signal; and
   the display panel is configured to display a target image in response to the drive signal, and switch from an operating state to a standby state in response to the standby instruction;
   wherein a number of colors contained in the target image is less than a number threshold.

2. The display device according to claim 1, wherein the target image is a single-color image.

3. The display device according to claim 2, wherein the target image is a black image.

4. The display device according to claim 1, wherein the drive signal carries image data of the target image.

5. The display device according to claim 1, wherein the drive circuit is further configured to transmit a resume instruction carrying the first image data to the display panel in response to detecting that the host computer delivers the first image data when the display panel is in the standby state; and
   the display panel is configured to switch from the standby state to the operating state in response to the resume instruction, and display an image based on the first image data upon switching to the operating state.

6. The display device according to claim 1, wherein the drive circuit is configured to determine that the host computer stops delivering the first image data in response to not receiving image data delivered by the host computer within a target time period upon receipt of the first image data.

7. The display device according to claim 1, wherein the drive circuit is configured to determine that the host computer stops delivering the first image data in response to a target instruction sent by the host computer, the target instruction being intended to instruct the host computer to stop delivering image data to the drive circuit.

8. The display device according to claim 1, wherein both the drive circuit and the display panel comprise a mobile industry processor interface (MIPI), and the drive circuit is coupled to the display panel by the MIPI and transmits signals and instructions to the display panel by the MIPI.

9. The display device according to claim 1, further comprising a first power supply circuit, a second power supply circuit, a control circuit, and an image acquisition assembly; wherein
   the first power supply circuit is coupled to the drive circuit and the display panel, and is configured to supply power to the drive circuit and the display panel;
   the second power supply circuit is coupled to the control circuit and the image acquisition assembly, and is configured to supply power to the control circuit and the image acquisition assembly;
   the control circuit is further coupled to the drive circuit, the first power supply circuit, and the image acquisition assembly, and is configured to control operating states of the drive circuit and the first power supply circuit, and transmit second image data acquired by the image acquisition assembly to the drive circuit;
   the drive circuit is further configured to transmit the first image data and the second image data received from the host computer to the display panel; and
   the display panel is configured to display an image based on the first image data and the second image data.

10. The display device according to claim 9, wherein the control circuit is a microcontroller unit.

11. The display device according to claim 9, wherein the control circuit comprises a general-purpose input/output (GIPO) pin and a universal serial bus (USB) interface; and
    the control circuit is coupled to the drive circuit by the GIPO pin, and coupled to the image acquisition assembly by the USB interface.

12. The display device according to claim 9, wherein the control circuit is further configured to transmit a disable signal to the first power supply circuit in response to determining that the drive circuit is to switch from the operating state to the standby state, and transmit an enable signal to the first power supply circuit in response to determining that the drive circuit is to switch from the standby state to the operating state; and
    wherein the first power supply circuit is configured to stop supplying power to the drive circuit in response to the disable signal, and continue supplying power to the drive circuit in response to the enable signal.

13. The display device according to claim 12, wherein the target image is a black image;
    the image data of the target image is carried by the drive signal;
    the drive circuit is further configured to transmit the resume instruction carrying the first image data to the display panel in response to detecting that the host computer delivers the first image data when the display panel is in the standby state; and the display panel is further configured to switch from the standby state to the operating state in response to the resume instruction, and display an image based on the first image data upon switching to the operating state;
    the drive circuit is configured to determine that the host computer stops delivering the first image data in response to image data delivered by the host computer being not received within a target time period upon receipt of the first image data; or determine that the first image data is stopped delivering by the host computer in response to a target instruction sent by the host computer, the target instruction being intended to instruct the host computer to stop delivering image data to the drive circuit;
    both the drive circuit and the display panel comprise a mobile industry processor interface (MIPI), and the drive circuit is coupled to the display panel by the MIPI, and transmits signals and instructions to the display panel by the MIPI;
    the control circuit is a microcontroller unit;
    the control circuit comprises a universal input/output (GIPO) pin and a universal serial bus (USB) interface;
    the control circuit is coupled to the drive circuit by the GIPO pin, and coupled to the image acquisition assembly by the USB interface;

the display device is an augmented reality device; and the display panel is an organic light-emitting diode display panel, and a resolution of the display panel is greater than a resolution threshold.

14. The display device according to claim 1, wherein the display device is an augmented reality device.

15. The display device according to claim 1, wherein the display panel is an organic light-emitting diode display panel, and a resolution of the display panel is greater than a resolution threshold.

16. A method for driving a display device, comprising:

transmitting a drive signal to a coupled display panel in response detecting that first image data is stopped delivering by a coupled host computer, wherein the drive signal is intended to instruct the display panel to display a target image, a number of colors contained in the target image being less than a number threshold; and transmitting a standby instruction to the display panel upon transmitting the drive signal, wherein the standby instruction is intended to instruct the display panel to switch from an operating state to a standby state.

17. The method according to claim 16, further comprising:

transmitting a resume instruction carrying the first image data to the display panel in response to detecting that the host computer delivers the first image data by the host computer when the display panel is in the standby state, wherein the resume instruction is intended to instruct the display panel to switch from the standby state to the operating state, and display an image based on the first image data upon switch to the operating state.

18. A display system, comprising a host computer and a display device; wherein the display device comprising a drive circuit and a display panel; wherein the host computer is coupled to the drive circuit, and is configured to deliver image data to the drive circuit;

the drive circuit is further coupled to the display panel, and is configured to transmit a drive signal to the display panel in response to detecting that the host computer stops delivering the first image data, and transmit a standby instruction to the display panel upon transmitting the drive signal; and the display panel is configured to display a target image in response to the drive signal, and switch from an operating state to a standby state in response to the standby instruction;

wherein a number of colors contained in the target image is less than a number threshold.

19. The system according to claim 18, wherein the display device further comprises a first power supply circuit, a second power supply circuit and a control circuit; wherein the host computer is further coupled to the control circuit, the first power supply circuit, and the second power supply circuit, and is configured to communicate with the control circuit and supply power to the first power supply circuit and the second power supply circuit.

20. The system according to claim 18, wherein the host computer is a mobile phone.

* * * * *